(12) United States Patent
Kinzer

(10) Patent No.: US 7,074,001 B2
(45) Date of Patent: Jul. 11, 2006

(54) CONVEYING SYSTEM FOR FILLING MULTIPLE STORAGE BINS

(76) Inventor: Dwight Eric Kinzer, P.O. Box 277, Circle Pines, MN (US) 55014-0277

( * ) Notice: Subject to any disclaimer, the term of this patent is extended or adjusted under 35 U.S.C. 154(b) by 186 days.

(21) Appl. No.: 10/771,807

(22) Filed: Feb. 3, 2004

(65) Prior Publication Data

US 2004/0154901 A1 Aug. 12, 2004

Related U.S. Application Data

(60) Provisional application No. 60/445,760, filed on Feb. 5, 2003.

(51) Int. Cl.
*B65G 65/00* (2006.01)
(52) U.S. Cl. .................. 414/272; 198/588; 198/812; 198/861.6; 414/283
(58) Field of Classification Search ............... 198/588, 198/812, 861.6; 414/272, 283
See application file for complete search history.

(56) References Cited

U.S. PATENT DOCUMENTS

| | | | |
|---|---|---|---|
| 312,387 A * | 2/1885 | Rowell | 198/715 |
| 772,957 A * | 10/1904 | Patterson | 414/272 |
| 846,792 A * | 3/1907 | Kennedy et al. | 198/588 |
| 1,204,203 A * | 11/1916 | Stuart | 198/536 |
| 1,346,990 A * | 7/1920 | Stuart | 198/535 |
| 2,277,416 A * | 3/1942 | Rutten | 414/302 |
| 2,420,653 A * | 5/1947 | Clark | 414/177 |
| 2,721,665 A | 10/1955 | Goeke | |
| 3,197,044 A | 7/1965 | Hozak | |
| 3,374,593 A | 3/1968 | Rensch | |
| 3,435,967 A * | 4/1969 | Sackett, Sr. | 414/295 |
| 3,904,024 A * | 9/1975 | Smith | 414/788.7 |
| 4,082,181 A * | 4/1978 | Berthold et al. | 198/861.4 |
| 4,213,724 A * | 7/1980 | Holderness | 414/133 |
| 4,330,232 A | 5/1982 | McClaren | |
| 4,491,216 A | 1/1985 | Sawby | |
| 4,557,353 A | 12/1985 | Pichon | |
| 4,619,576 A * | 10/1986 | George et al. | 414/300 |
| 4,972,940 A * | 11/1990 | Gleason | 198/588 |
| 5,099,634 A * | 3/1992 | Treloar | 53/475 |
| 5,596,865 A * | 1/1997 | Kramer | 53/428 |
| 2003/0113194 A1 | 6/2003 | Stafford | |

FOREIGN PATENT DOCUMENTS

| | | |
|---|---|---|
| CH | 617 742 A | 6/1980 |
| DE | 270042 C | 10/1912 |
| FR | 1 110 447 A | 2/1956 |
| GB | 752 816 A | 7/1956 |
| GB | 1 033 890 A | 6/1966 |
| WO | PCT/US2004/003214 | 8/2004 |
| WO | PCT/US2004/003214 | 12/2004 |

OTHER PUBLICATIONS

PCT International Search Report, Mailed: Jul. 26, 2004.

(Continued)

*Primary Examiner*—Thomas J Brahan

(57) ABSTRACT

A conveying system for distributing material into any bin in a horizontal array of storage bins comprises a circular guide positioned over the array of bins (24), a linear guide (22) that rotates along the circular guide, and a conveyor (30) that is supported by the linear guide. By rotating the linear guide and attached conveyor along the circular guide and by shuttling the conveyor linearly, the conveyor has an infinite number of discharge points to fill any one of the underlying array of bins.

19 Claims, 5 Drawing Sheets

OTHER PUBLICATIONS

PCT International Preliminary Examination Report, Mailed: Nov. 18, 2004.

Kinzer, D. Feb. 5, 2003. PPA: "Polygonal Storage Silo(s) and Process Tower". 78 pages. U.S. Appl. No. 60/445,760.

Kinzer, D. 2003. "Five Case Studies: A cost comparison of silos—hexagon, round, and square." 21 pages. Copyright Process Equipment & Design LLC.

* cited by examiner

CONVEYING SYSTEM FOR FILLING MULTIPLE STORAGE BINS

CROSS-REFERENCE TO RELATED APPLICATIONS

This application claims the benefit of PPA of Dwight E. Kinzer, Ser. No. 60/445,760, filed 5 Feb. 2003.

FEDERALLY SPONSORED RESEARCH

Not applicable

SEQUENCE LISTING OR PROGRAM

Not applicable

BACKGROUND OF THE INVENTION

1. Field of the Invention

This invention relates to distribution systems for filling storage bins, specifically to such systems that fill a plurality of closely-spaced bins.

2. Discussion of Prior Art

A significant cost in designing feed mills, grain elevators, and seed conditioning plants, and the like is the distribution system. Facilities such as these typically require many linear meters of conveying equipment. Such equipment can be costly, not only in actual price, but also in terms of maintenance and energy requirements. With the onset of increased purity requirements worldwide, one must also consider cross-contamination issues when choosing methods of distribution. Efficiency and good cleanout, where little or no product remains on the conveyor after it reaches its destination, are two characteristics of conveying systems that are highly desirable in the feed, grain, and seed industries. Current methods of conveying product to bins generally requires a relatively large amount of linear meters of conveyors. Often, the design of a facility's conveying system requires multiple discharge gates, which are sources of cross-contamination and poor cleanout. Filling an array of bins using conventional methods usually requires many linear-feet of conveying equipment, multiple intermediate discharge gates (which are sources of cross-contamination), and a relatively large amount of energy to run the equipment.

Preventing cross-contamination has become a priority in the feed, grain, and seed industries. Cross-contamination issues have become prevalent in recent years due to several factors, such as increased demand for identity preserved traits and the development of genetic engineering to produce genetically modified organisms (GMO). Processors increasingly demand products with characteristics that are best suited for the desired end product. Governments have more strict purity requirements regarding the amount of GMO allowed in Non-GMO products. And consumers desire segregation of GMO from non-GMO products.

Mounting international pressure to trace ingredients to points of origin have also contributed to the need to further prevent cross-contamination, and to segregate ingredients. Segregated storage is a concept that is gaining acceptance in the grain and feed industries, since it can enhance value of stored products and help minimize the potential risks associated with foodborne diseases and bioterrorism. Products can be differentiated by such characteristics as the following: (a) ingredient origin, (b) plant variety, (c) protein level, (d) moisture level, (e) quality, (f) particle size, (g) field origin, (i) growing conditions, (k) foreign matter level, or (l) GMO status, for example. Segregated storage and tracing ingredients to their points of origin have recently become even more important in these industries, not only because of regulations put forward by the European Union, but also due to the first documented case of Bovine Spongiform Encephalopathy, or Mad Cow Disease, in the United States. A diseased dairy cow is believed to have contracted the illness from contaminated feed. Efficient segregated storage, aided with a conveying system that greatly reduces or virtually eliminates the chance of cross-contamination, is a fundamental tool in complying with trace-to-origin regulations, and in reducing risks associated with cross-contamination in general.

Attempts have been made to reduce the amount of linear meters of conveyor required to fill a plurality of bins. Examples of such conveying systems include those disclosed in U.S. Pat. No. 4,330,232 to McClaren (1982), U.S. Pat. No. 3,197,044 to Hozak (1965), U.S. Pat. No. 4,491,216 to Sawby (1985), U.S. 2003/0113194 to Stafford & Elder (2003), and U.S. Pat. No. 3,435,967 to Sackett (1969).

McClaren attempts to fill a plurality of bins arranged in circular arcs about a central pad. Limitations of this arrangement include the following: (1) the use of screw conveyors creates cross-contamination issues, since they are not easily completely cleaned of product; (2) rotation is limited by product receiving area requirements; (3) multiple conveyors are needed to reach outlying bins; and (4) the design requires a relatively large footprint, which may be limiting in many facilities.

Hozak's device is somewhat similar to McClaren's, except it uses belt conveyors. In Hozak's design, the system once again requires a relatively large footprint, and as the height of the bins increase, so does the floor space requirement. This system also requires significant space above the bins. Consequently, very tall roofs, known as head houses, would be required if this system were used in enclosed multi-silo structures.

In Sawby's apparatus, a swiveling conveying system with an extendable auger at the end of a boom that pivots around a mast is limited to filling only one arc of receptacles, it requires a large footprint, and cleanout is relatively difficult.

The conveying system disclosed by Sackett is functionally limited to square or rectangular bins, and it requires multiple conveyors.

Stafford and Elder's device requires a large footprint and is limited to one type of structure.

Other conventional methods of distributing to multiple silos include belt, drag chain, or screw conveyors. These methods incorporate multiple intermediate discharge gates so the conveyor can discharge at multiple points along the conveyor. The problem with all of these conventional conveyors is that the intermediate discharge gates tend to have carryover problems that can cause potential cross-contamination. If the entire product does not fall through the open intermediate discharge gate, the product can be conveyed to an unintended storage bin. Also, intermediate discharge gates on a conventional conveyor tend to seal imperfectly with the conveyor trough, creating further cross contamination potential.

An alternative to using conveying systems, like those described above, is down-spouting. However, down-spouting requires a relatively tall head house, often from about 10 m to 20 m above the bins to be filled. As a result, down-spouted items can reach relatively high speeds, and thus can land harshly within a bin. Such impacts can lower product quality, and so, in many cases, down-spouting is undesirable.

In summary, the following are typical disadvantages of conventional conveying or spouting systems to fill a cluster of bins:

(a) many linear meters of conveyor are needed, which increases cross-contamination risk and adds to energy and maintenance costs;
(b) multiple discharge gates are often necessary, which increases risk of cross-contamination;
(c) multiple motors are usually needed, which adds to energy and maintenance costs; and
(d) a large footprint is often required.

Objects and Advantages

Accordingly, several objects and advantages of the present invention are:

(a) to provide an improved conveying system that can fill a plurality of closely-spaced storage bins with minimal linear meters of conveyors, thus lowering associated energy requirements and maintenance costs;
(b) to provide a conveying system that eliminates a need for multiple discharge openings and intermediate discharge gates, thus reducing risks associated with cross-contamination; and
(c) to provide a conveying system in which product quality is preserved.

Further objects and advantages are to provide a conveying system that is efficient in terms of cost, clean-out, space requirements, energy requirements, and maintenance. The conveying system can also be automated, with electrical location sensors that can position the discharge end(s) of the conveyor at an infinite number of discharge locations, to expand its efficiencies. Still further objects and advantages will become apparent from a consideration of the ensuing description and drawings.

SUMMARY

In accordance with the present invention, a conveying system for feeding a plurality of closely-spaced horizontally arrayed storage receptacles with or without shared walls from above comprises a conveyor that is supported by and shuttles along a linear track. The linear track is supported by and rotates along a curvilinear track. The conveyor discharges product into a selected one of a plurality of underlying storage receptacles. The conveying system provides an infinite number of discharge points.

DRAWINGS—FIGURES

Figure 1:
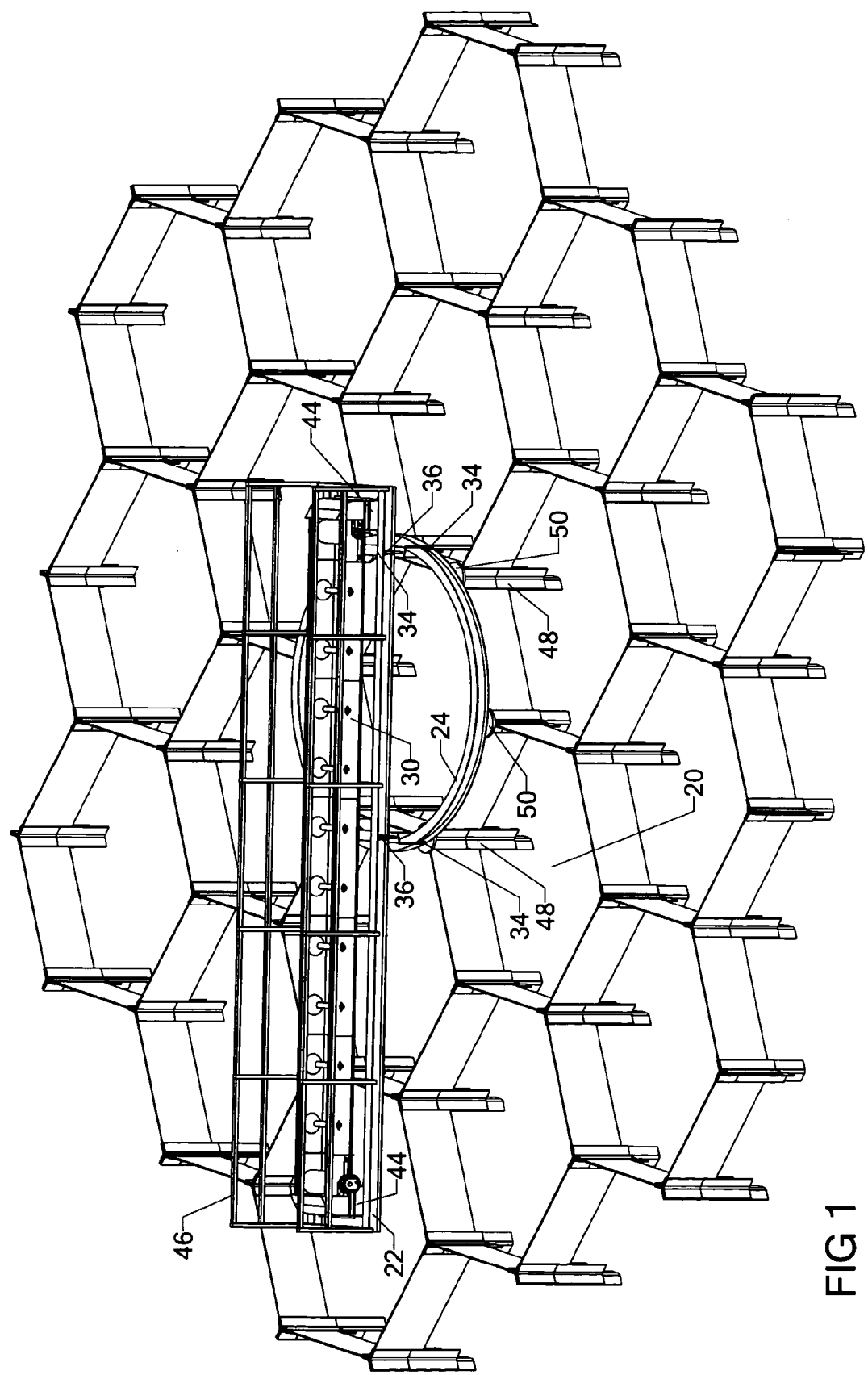
FIG. 1 is an isometric view of a rotating horizontal conveying system showing an arcuate guiding system and a linear guiding system, in a resting position.

DRAWINGS—REFERENCE NUMERALS 20 bin
22 linear track
24 arcuate track
30 conveyor
34 first powered truck
35 load bar
36 second powered truck
37 load bar
38 wheel
40 wheel rod
44 discharge end
46 catwalk
48 column
50 column cap
52 second conveyor

DETAILED DESCRIPTION—FIGS. 1, 2, 3A, AND 3B: PREFERRED EMBODIMENT

Figure 2:
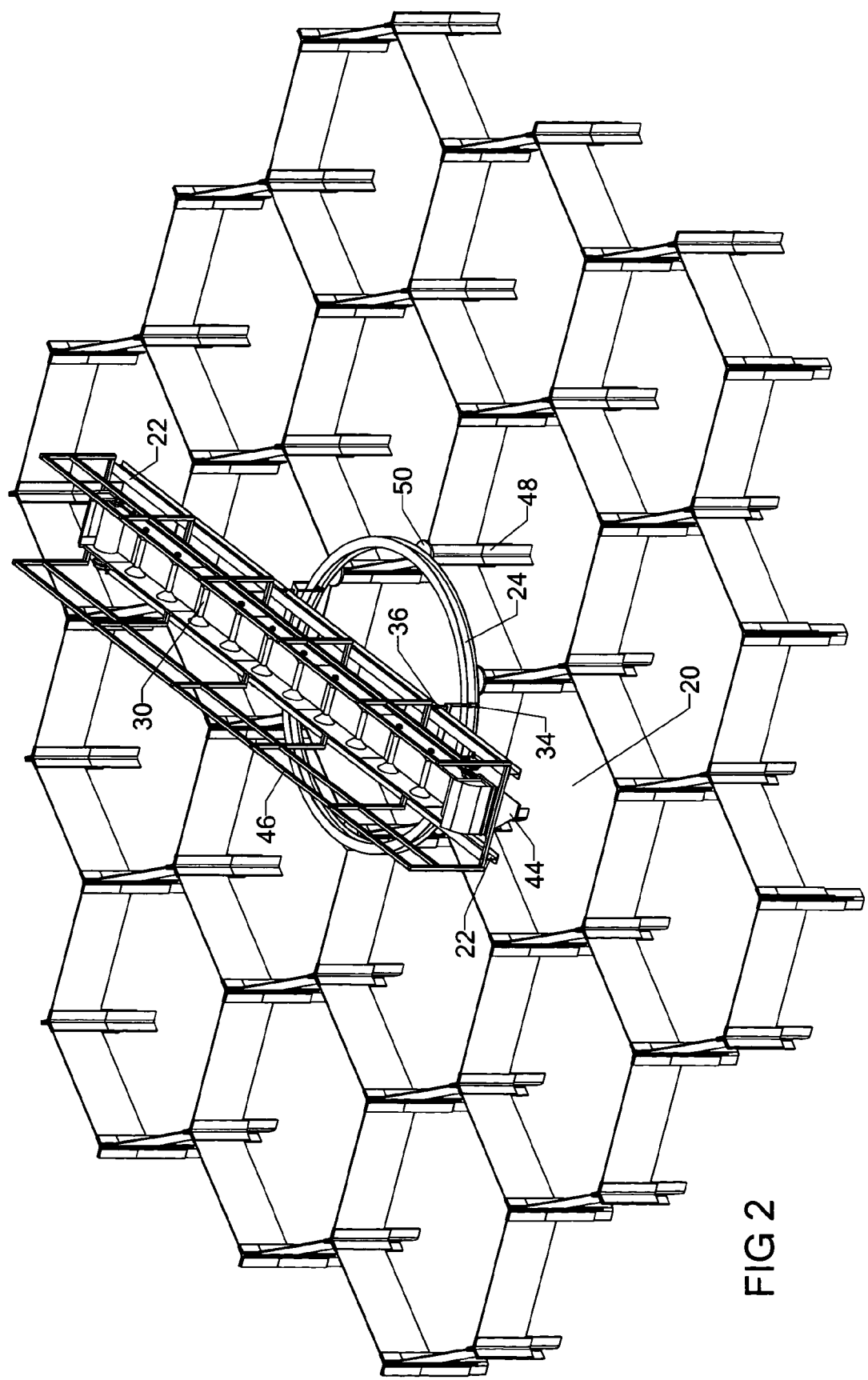
FIG. 2 shows the conveying system of FIG. 1 rotated about 45 degrees and retracted over a selected bin.

A preferred embodiment of a rotating multiple-track horizontal conveying system of the present invention is shown in an isometric view in FIG. 1. FIG. 1 shows the embodiment at rest, with an underlying structure comprising multiple bins that are horizontally arrayed. Only top portions of the bin structure is shown, for reference, since virtually any type of well-known multiple bin array configuration can be used. FIG. 2 shows the conveying system in a new position rotated about 45 degrees from its position in FIG. 1 and retracted to a selected bin 20 that is ready to be filled. As seen in FIGS. 1 and 2, the conveying system includes two parallel linear tracks 22 and one arcuate track 24. In general, the number of concentric arcuate tracks can range from one to several, depending on the type of track used, the weight of items to be conveyed, and the distance that items will be conveyed, as will be discussed elsewhere. Linear tracks 22 preferably support a horizontal belt conveyor 30, but standard screw or drag types of conveyors can be used. In the example in FIGS. 1 and 2, powered trucks (trolleys) 34 and 36 support linear tracks 22 above arcuate track 24. In general, however, linear tracks can be supported above or suspended below the arcuate track or tracks.

Linear tracks 22 and arcuate track 24 work in conjunction with each other to position discharge ends 44 over any desired bin within the cluster of bins. Means of powering movement along the tracks are not shown, but I presently prefer one motor for linear movement and another for rotational movement. However, use of power chains and drive motor(s), a hydraulic system, manual rotation and shuttling, or a single motor to move both linearly and rotationally can be alternatively employed. The rotating horizontal conveying system can also be automated (not shown), for example, with electrical location sensors, and/or bin level indicators that indicate when a bin is full. In the example, tracks 22 and 24 are standard monorail I-beam tracks, but any suitable standard track configuration can alternatively be used. For example, flat bar, I-beam, C-beam, double-channel, enclosed tubular, bolted angles, and T-track are suitable for the conveying system, based in part on the weight of items to be conveyed and the distance that items will be conveyed.

The diameter of arcuate tack 24 as shown in FIGS. 1 and 2 is about 6.3 m, much smaller than the approximate collective 27.4-m diameter of the bin cluster in the example. Consequently, an assembly for preventing conveyor 30 and linear track 22 from derailing due to severely unbalanced loads can be incorporated. A fri-cam truck/trolley assembly, such as powered trolleys 34 and 36 which act as rotatable means and are shown more clearly in FIG. 3B, is usually sufficient to prevent such a calamity. Other trolley assemblies or methods can be engineered to withstand the weight of the equipment and the product being conveyed, while preventing conveyor 30 from tipping off of the track system, by those skilled in the art. For example, conveyor 30 and/or linear tracks 22 can include a cantilever device. Generally, any appropriate radius for arcuate track 24, any suitable trolley assembly, any well-known cantilever system (not shown), and/or multiple concentric arcuate tracks can be used in this conveying system.

In the example in FIGS. 1 and 2, linear tracks 22 are about the same length as conveyor 30, and they are significantly longer than the diameter of arcuate track 24. Alternatively, linear tracks 22 can be significantly shorter than conveyor 30, such that discharge ends 44 of conveyor 30 extend beyond the end of linear tracks 22. In such instances, means to counterbalance the weight of the product being conveyed and the weight of the equipment is employed (not shown). For example, load bar 37 of second powered trucks 36 would be attached directly to conveyor 30 so that conveyor 30 would shuttle directly along linear tracks 22, which would be fixed. Linear tracks 22 would only rotate about arcuate track 24 via first powered truck 34, rather than also translating laterally on second powered trucks 36. This type of situation will be discussed further elsewhere.

Figure 3:
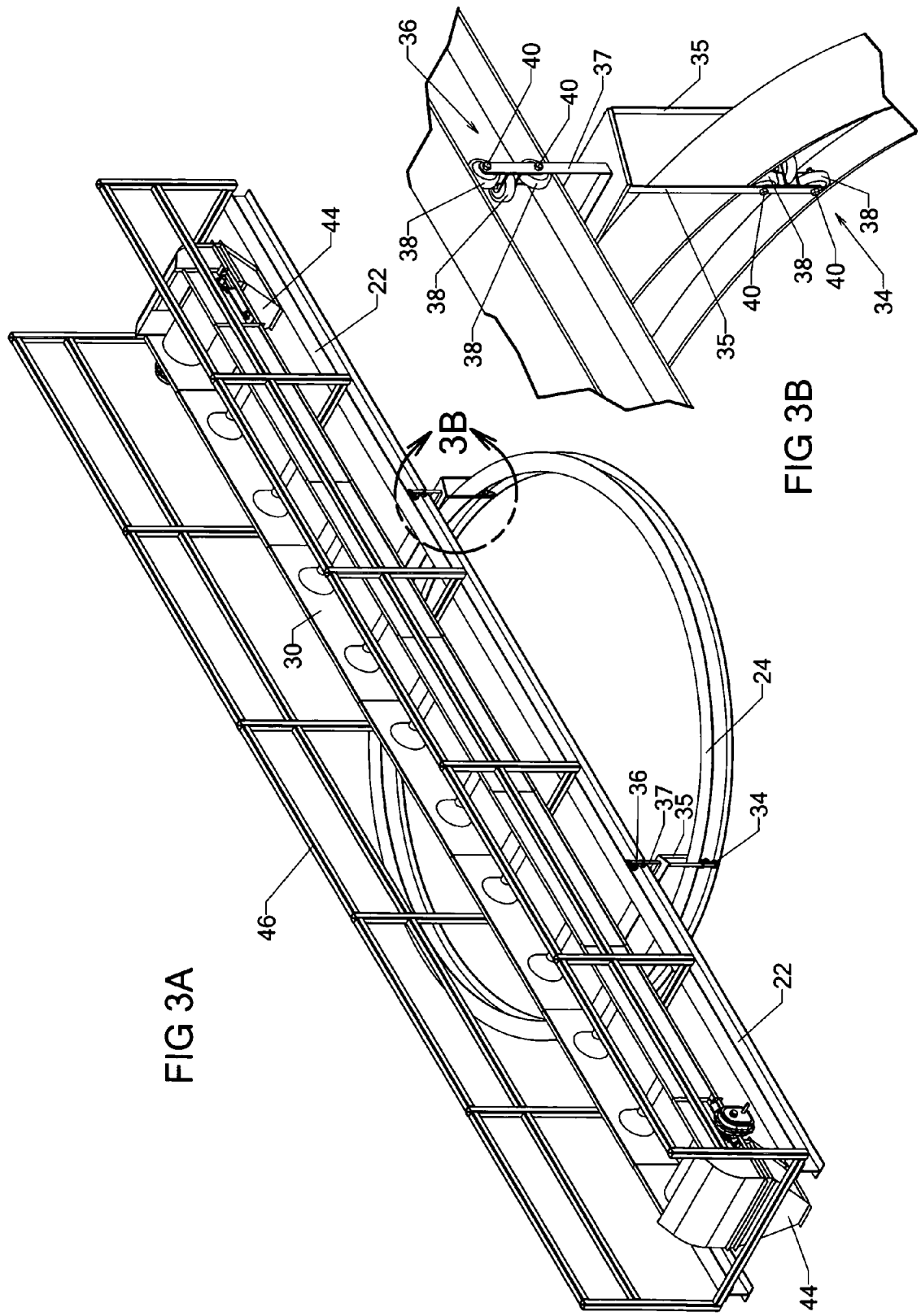
FIGS. 3A and 3B show enlargements of the conveyor and dual track system shown in FIGS. 1 and 2.

Catwalk 46 is attached to conveyor 30, for maintenance and service access, and so it also moves with the conveyor, as seen in FIGS. 1-3. Catwalk 46 is not required when conveyor 30 is easily and safely accessible.

Conveyor 30 can be of the standard screw, belt, or drag-chain types. However, belt conveyors provide more complete product cleanout compared to other types of conveyors. Consequently, belt-type conveyors are usually preferable, especially if reducing cross-contamination is a priority. In the example in FIGS. 1 and 2, the horizontal length of conveyor 30 is slightly less than the collective 13.25-m (about 43.5-ft) radius of the bin cluster. Conveyor 30 is reversible, or bi-directional, in the example, so it has two discharge ends 44. Only one discharge end 44 can be used at a time, since conveyor 30 travels in one direction at a time.

Conveyor 30 can receive product at virtually any point along its length, and it is usually fed from a fixed point. Typically, a fixed vertical conveying system (not shown) transfers product from a receiving area (not shown) to conveyor 30. Conveyor 30 can be fed by a variety of well-known existing vertical-conveying methods, including, but not limited to, the following: (a) a bucket elevator that rises through and is spouted to about the center axis of the arcuate track or tracks, where it discharges onto conveyor 30; (b) a bucket elevator that rises through an offset location within the cluster of bins and is spouted to conveyor 30; (c) a bucket elevator that is positioned outside the diameter of the bin cluster and discharges onto a stationary horizontal conveyor, which transfers product to discharge onto conveyor 30; or (d) a pneumatic conveying system, which uses air pressure, that discharges onto conveyor 30.

In the example in FIGS. 1 and 2, arcuate track 24 is supported directly by portions of the underlying multiple bin array, namely load-bearing columns 48 with caps 50. Struts can be added where required (not shown). Other track support means are possible. For example, the tracks can be suspended from above, as will be discussed elsewhere, or supported by other suitable means, such as structural columns, with or without struts, that are independent of the underlying bin array.

In FIG. 3A, a first set of powered trucks 34 rotates along arcuate track 24. A load bar 37 of a second set of powered trucks 34 is oriented perpendicular to a load bar 35 of first powered truck 34, and attaches to first powered track 34. Linear tracks 22 with attached conveyor 30 move along second powered trucks 36. In a close-up view of FIG. 3B (taken from FIG. 3A), wheels 48, rods 40, and load bars 35 and 37 can be seem more clearly. In thin example, each truck 34 and 36 has three wheels 48 with connecting wheel rods 50. Although a tri-wheel trolley assembly is shown, other known suitable means for allowing movement along the tracks can be used, such as dual-cam assemblies, other wheel configurations, bearings, etc. Powered trucks are used in this preferred embodiment, but other well-known types of trolley systems or movement systems can be used.

Thus, only one horizontal conveyor, with infinite discharge points and a minimal amount of linear meters, is needed to fill a plurality of bins; no intermediate discharge gates are required; and overhead space requirements are minimal, usually requiring no more than about 1–2 m (about 3–6 feet).

Operation: FIGS. 1 AND 2

In operation, the rotating horizontal conveying system is seen in a resting position in FIG. 1, before it is moved to feed the desired bin 20 in FIG. 2. In FIG. 2, conveyor 30 of FIG. 1 is rotated 90 degrees along arcuate track 24, and conveyor 30 is extended along linear track 22 until discharge end 44 is positioned above bin 20. Conveyor 30 is now ready to receive product from a feeding conveyor system (not shown). The feeding conveyor system can be of any number of suitable configurations, such as those discussed previously.

When using a reversible conveyor, such as the one shown in FIG. 1 and discussed previously, conveyor 30 and attached catwalk 46 need rotate only 180 degrees or less to be able to access any given silo within a cluster of silos. If a non-reversible, or uni-directional, conveyor is used, then the conveyor-catwalk assembly will need to rotate about 360 degrees.

Figure 4:
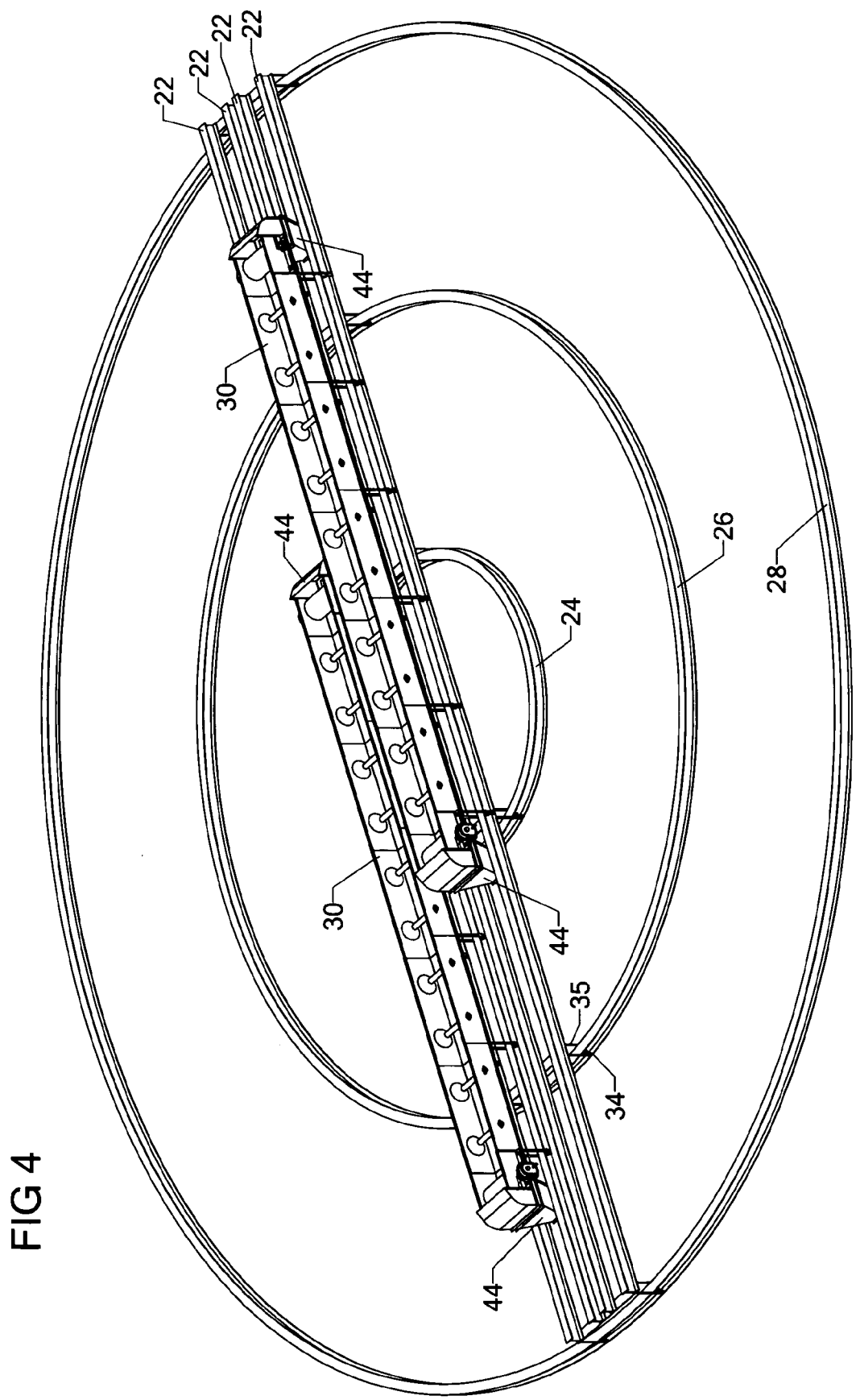
FIG. 4 shows an alternative embodiment which differs from that in FIGS. 1–3 in that it has multiple concentric arcuate tracks, two linear guiding systems and corresponding conveyors, and a different trolley system.

FIG. 4: Alternative Embodiments—Multiple Concentric Arcuate Tracks; Multiple Conveyors In an alternative embodiment as shown in FIG. 4, concentric arcuate tracks 26 and 28 can be added, if additional support or balancing of linear track 22 or conveyor 30 is needed. Linear tracks 22 extend about the full diameter of outermost concentric arcuate track 28. Powered trucks 34 and 36 of this system are modified so that linear tracks 22 are affixed to load bar 35 of first powered truck 34. Load bar 37 of second powered truck 36 attaches to conveyor 30 (or conveyor 30 with catwalk 46, not shown) so that conveyor 30 (and attached catwalk 46, when required) shuttles along linear tracks 22. As a result, in this embodiment, linear tracks 22 only rotate along arcuate tracks 24, 26, and 28 rather than also translating along second powered trucks 36 as shown in FIGS. 1 and 2 (previously discussed). Trucks 34 and 36 need not be powered, as in this example. Other well-known trolley or wheel assemblies may be used to achieve rotation and linear movement.

As also shown in FIG. 4, more than one horizontal conveyor and linear track system can be incorporated on the same arcuate track system. A second conveyor 52 and its associated embodiments, such as linear track system, catwalk, or both, is arranged in parallel to conveyor 30. Thus, more than one bin can be filled simultaneously.

Figure 5:
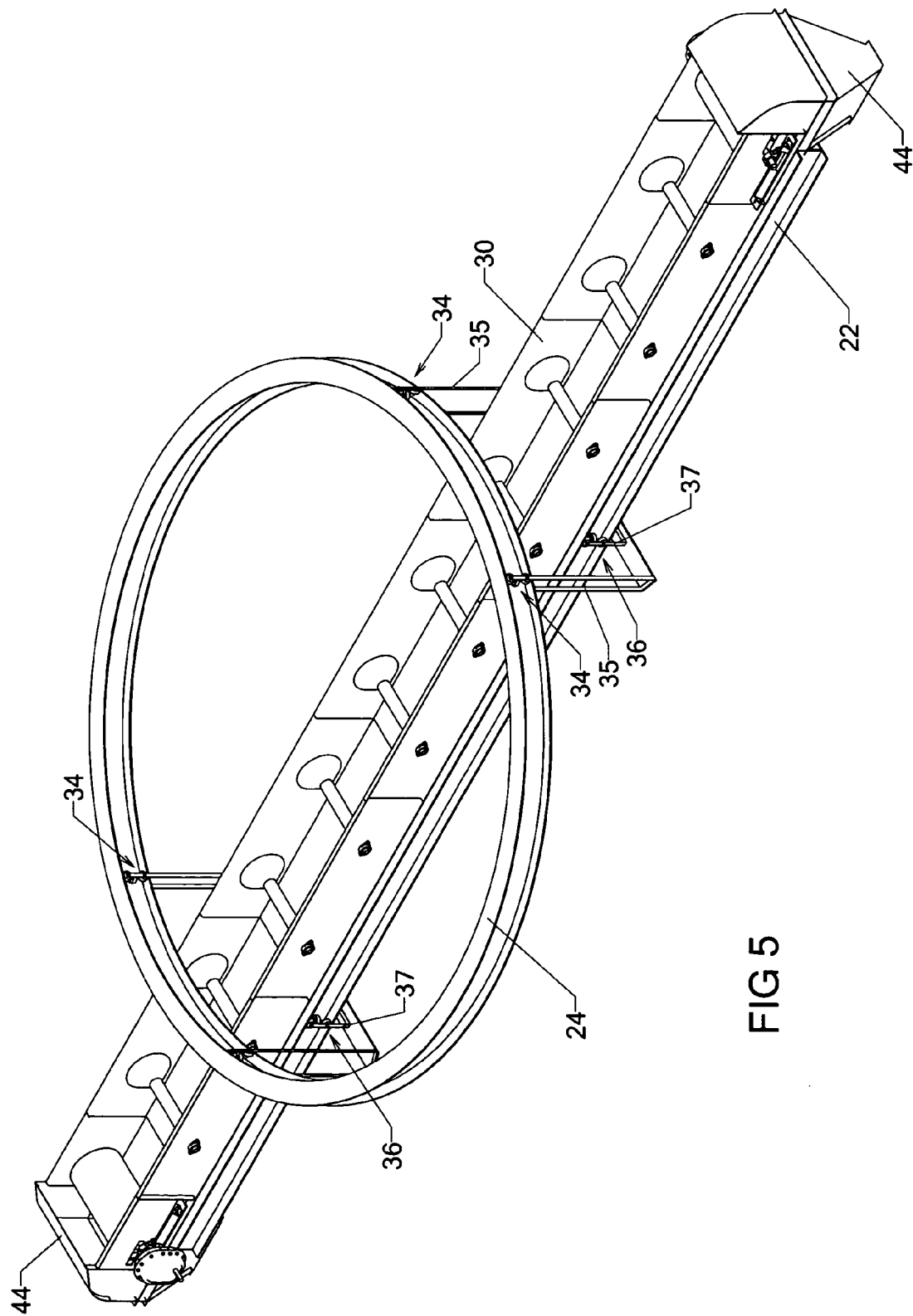
FIG. 5 shows an alternative embodiment which differs from that in FIGS. 1–3 in that linear tracks are suspended from the arcuate track.

FIG. 5: Suspended from Roof

In another alternative embodiment, as shown in FIG. 5, arcuate track 24 can be suspended from above, such as from roof rafters (not shown), with linear tracks 22 suspended below arcuate track 24. The arrangement of first powered trucks 34 differs slightly from previously described embodiments in that load bars 35 are inverted, to support second trucks 36, linear tracks 22, and conveyor 30 below arcuate track 24. Such trolley/truck systems can vary according to methods that are well-known to those skilled in the art, and so the embodiment is not limited to the example shown here.

A suspended embodiment, like the one shown in FIG. 5, can exist alone or co-exist in the same structure with the preferred embodiment shown in FIGS. 1 and 2 (not shown). This alternative embodiment can also be used alone or at the same time as the preferred embodiment previously discussed, to fill more than one bin simultaneously. In such a suspended system, a telescoping spout(s) (not shown) with adequate length to reach underlying bins may be required at discharge end(s) 44 of conveyor 30. The suspended system can be fed by a feeding system that is the same or different from that feeding the first system.

Conclusion, Ramifications, And Scope

The present conveying system can be used to fill a plurality of closely-spaced bins from above with maximum efficiency since it provides a means for infinite discharge locations, using only one horizontal conveyor. The need for intermediate discharge gates, which significantly increase risks of cross-contamination, is eliminated. Furthermore, the improved rotating horizontal conveying system has the additional advantages in that it is more economical to build, install, operate, and maintain than conventional conveyor or spouting distribution systems.

Although the description above contains many specificities, these should not be construed as limiting the scope of the invention, but as merely providing illustrations of some of the presently preferred embodiments of this invention. Other embodiments are possible. For example, the conveyor can be replaced by other known types of conveyor, such as drag or chain types; and/or other known types of track systems can be used, such as flat bar, I-beam, C-beam, double-channel, enclosed tubular, bolted angles, or T-track; and/or other known types of truck or trolley assemblies can be used. The system can be used to fill a plurality of bins that are of other polygonal shapes, such as square, rectangular, or octagonal. The system can be used to fill a plurality of closely spaced round bins. The arc of the arcuate track can be less than 360 degrees. More than one conveyor and linear track assembly can be used simultaneously on one arcuate track system; and/or more than one arcuate/linear track/conveyor assembly can co-exist to feed multiple bins simultaneously. The conveyor can have telescoping spouts at its discharge ends; it can be non-reversing, having only one discharge end and one tail end; it can incline or decline from horizontal; the system can be automated; and/or the conveyor can be enclosed, with or without telescoping spouts at discharge and/or inlet points; etc. Thus the scope of the invention should be determined by the appended claims and their legal equivalents, rather than by the examples given.

I claim:

1. A conveyor guidance system for distributing material into a plurality of storage receptacles, comprising: a stationary horizontally oriented circular guide means supported above and between an array of stationary receptacles that encircle said circular guide means, said circular guide means having a predetermined diameter; a substantially horizontally oriented linear guide means extending at least the length of said predetermined diameter of said circular guide means and mounted to rotate thereon, and a substantially horizontally oriented conveying means mounted to linear guide means for moving linearly therewith, said conveying means having at least one discharge end, whereby said circular guide means and said linear guide means enable said conveying means to distribute said material to any one of an infinite number of discharge points above said receptacles.

2. The conveyor guidance system of claim 1 wherein said circular guide means comprises at least one circular track supporting a first rotatable means and a second rotatable means, said first and second rotatable means each comprising at least one wheel connected to at least one rod, and at least one load bar supporting said rod, said load bar of said first rotatable means supporting said second rotatable means, said second rotatable means being attached substantially perpendicularly to said first rotatable means, said load bar of said second rotatable means supporting said linear guide means, said first rotatable means being movable along said circular guide means, said linear guide means being movable along said second rotatable means, and said conveying means being mounted on said linear guide means.

3. The conveyor guidance system of claim 1 wherein said circular guide means comprises at least one circular track and a first rotatable means, said first rotatable means comprising at least one wheel being connected to at least one rod and at least one load bar supporting said rod and connected to said linear guide means, said linear guide means being mounted on said load bar of said first rotatable means, said linear guide means comprising a second rotatable means that moves linearly along said linear guide means, said second rotatable means comprising at least one wheel being connected to at least one rod and at least one load bar supporting said rod, said conveying means mounting to said load bar of said second rotatable means.

4. The conveyor guidance system of claim 1, further including a first control means for achieving rotation of said linear guide system along said circular guide system, and a second control means for achieving linear movement of said conveying means.

5. The conveyor guidance system of claim 1 wherein said conveying means comprises at least one conveyor, said conveyor being reversible so tat either end can serve as a discharge end.

6. A horizontally-oriented, rotating and translating conveying system with an infinite number of discharge points for distributing material to a plurality of horizontally arrayed storage receptacles, comprising: at least one stationary circular guide system supported above and between an array of stationary receptacles that encircle said circular guide system and having a first rotatable means, said circular guide system comprising at least one circular track, at least one linear guide system, said linear guide system mounted on said first rotatable means, said linear guide system comprising a plurality of parallel linear tracks and a second rotatable means connected to said parallel linear tracks, and at least one horizontal conveying means mounted on said second rotatable means, whereby by adjusting said circular guide means and said linear guide means enable said conveying means to distribute said material to any of an infinite number of discharge points above said receptacles.

7. The conveying system of claim 6 wherein said first and second rotatable means each include wheels rotatably mounted on respective rods, said first and second rotatable means each further including load bars, said load bars supporting said rods, said load bar from said first rotatable means supporting said linear tracks, said load bar from said second rotatable means supporting said conveying means.

8. The conveying system of claim 6, further including a first control means for rotating said linear guide system along said circular guide system, and a second control means for moving said conveying means along said linear guide system.

9. The conveying system of claim 6 wherein said conveying means is reversible so that either end can serve as a discharge end.

10. A conveyor guidance system for distributing material into a plurality of storage receptacles in a horizontal array, comprising: a stationary substantially horizontally oriented circular guide means supported above and between an array of stationary storage receptacles that encircle said circular guide means, a substantially horizontally oriented linear guide means supported by said circular guide means, said circular guide means having a predetermined diameter and comprising at least a first rotatable means and a second rotatable means, said first and second rotatable means each comprising at least one wheel connected with at least one rod, said rod being supported by at least one load bar, said load bar of said second rotatable means being attached substantially perpendicularly to said load bar of said first rotatable means, said wheels of said second rotatable means supporting said linear guide means, said first rotatable means being movable along said circular guide means, a substantially horizontally oriented conveying means mounted to said linear guide means, so that said linear guide means and said conveying means move linearly together along said second rotatable means, and said linear guide means travels about said circular guide means with said first rotatable means, whereby through adjustment at both said circular guide means and said linear guide means, said conveying means can distribute said material to any of an infinite number of discharge points above said receptacles, with a minimal amount of linear meters of horizontal conveyor.

11. The conveyor guidance system of claim 10, further including a first control means for rotating said first rotatable means along said circular guide means, and a second control means for moving said linear guide means along said second rotatable means.

12. The conveyor guidance system of claim 10 wherein said conveying means comprises a conveyor, said conveyor being reversible so that either end can serve as a discharge end.

13. The conveyor guidance system of claim 10 wherein said circular guide system comprises at least one arcuate track and said linear guide system comprises at least one linear track.

14. A method of filling a plurality of storage receptacles, comprising: (a) providing a stationary substantially horizontally oriented circular guide system supported above and between a plurality of stationary storage receptacles in a fixed array that encircles said circular guide system, (b) providing a substantially horizontally oriented linear guide system, said linear guide system being mounted to said circular guide system with at least a first rotatable means, (c) providing a substantially horizontally oriented conveyor, said conveyor being mounted on said linear guide system, (d) moving said conveyor laterally along said linear guide system, and rotating said linear guide system along said circular guide system, so as to position a discharging end of said conveyor over a selected receptacle from said plurality of storage receptacles.

15. The method of claim 14, further including the step of providing a horizontal array of storage receptacles positioned under said guide system.

16. The method of claim 14 further providing said circular guide system with at least one arcuate track.

17. The method of claim 14 further providing said linear guide system with at least one linear track.

18. The method of claim 14, further providing a second rotatable means, fixing and positioning said second rotatable means at about 90 degrees from said first rotatable means, said linear guide system being attached to said second rotatable means, so that said linear guide means is attached directly to and moves linearly with said conveyor along said second rotatable means.

19. The method of claim 14, further providing a second rotatable means, said second rotatable means being attached to said conveyor, so that said conveyor shuttles along said linear guide means, said linear guide means being attached directly to said first rotatable means.

* * * * *